US010251249B2

(12) United States Patent
Kurihara et al.

(10) Patent No.: US 10,251,249 B2
(45) Date of Patent: Apr. 2, 2019

(54) ILLUMINATION APPARATUS AND LIGHTING METHOD

(71) Applicant: PANASONIC INTELLECTUAL PROPERTY MANAGEMENT CO., LTD., Osaka (JP)

(72) Inventors: Shinichiro Kurihara, Osaka (JP); Tomoaki Mannami, Osaka (JP); Kouichi Mitsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/894,659

(22) Filed: Feb. 12, 2018

(65) Prior Publication Data

US 2018/0235062 A1    Aug. 16, 2018

(30) Foreign Application Priority Data

Feb. 15, 2017    (JP) ................................ 2017-026472

(51) Int. Cl.
*H04B 10/11*    (2013.01)
*H05B 33/08*    (2006.01)
*H05B 37/02*    (2006.01)

(52) U.S. Cl.
CPC ......... *H05B 37/0281* (2013.01); *H04B 10/11* (2013.01); *H05B 33/0845* (2013.01); *H05B 37/0272* (2013.01); *Y02B 20/42* (2013.01)

(58) Field of Classification Search
CPC ............ H05B 37/0281; H05B 37/0272; H05B 33/0845; H04B 10/11
See application file for complete search history.

(56) References Cited

U.S. PATENT DOCUMENTS

| | | | |
|---|---|---|---|
| 2013/0131882 A1* | 5/2013 | Verfuerth ........... | H05B 37/0272 700/295 |
| 2017/0202069 A1* | 7/2017 | Hidaka .............. | H05B 33/0851 |
| 2017/0265268 A1* | 9/2017 | Couch ..................... | H04W 4/06 |
| 2018/0139815 A1* | 5/2018 | Cho .................... | H04L 12/2803 |

FOREIGN PATENT DOCUMENTS

JP    2014-082218 A    5/2014

* cited by examiner

*Primary Examiner* — Dedei K Hammond
*Assistant Examiner* — Raymond R Chai
(74) *Attorney, Agent, or Firm* — McDermott Will & Emery LLP

(57) ABSTRACT

An illumination apparatus includes: a light source; a communication device that performs wireless communication, a timer that indicates a current time; a storage that stores scene information indicating a scene specified by at least one of dimming and toning, and an activation time indicating a time at which the scene indicated by the scene information should be activated; and a controller that, when the current time indicated by the timer reaches the activation time, causes the light source to emit light in a mode for the scene indicated by the scene information, and transmits the scene information and the current time via the communication device.

12 Claims, 4 Drawing Sheets

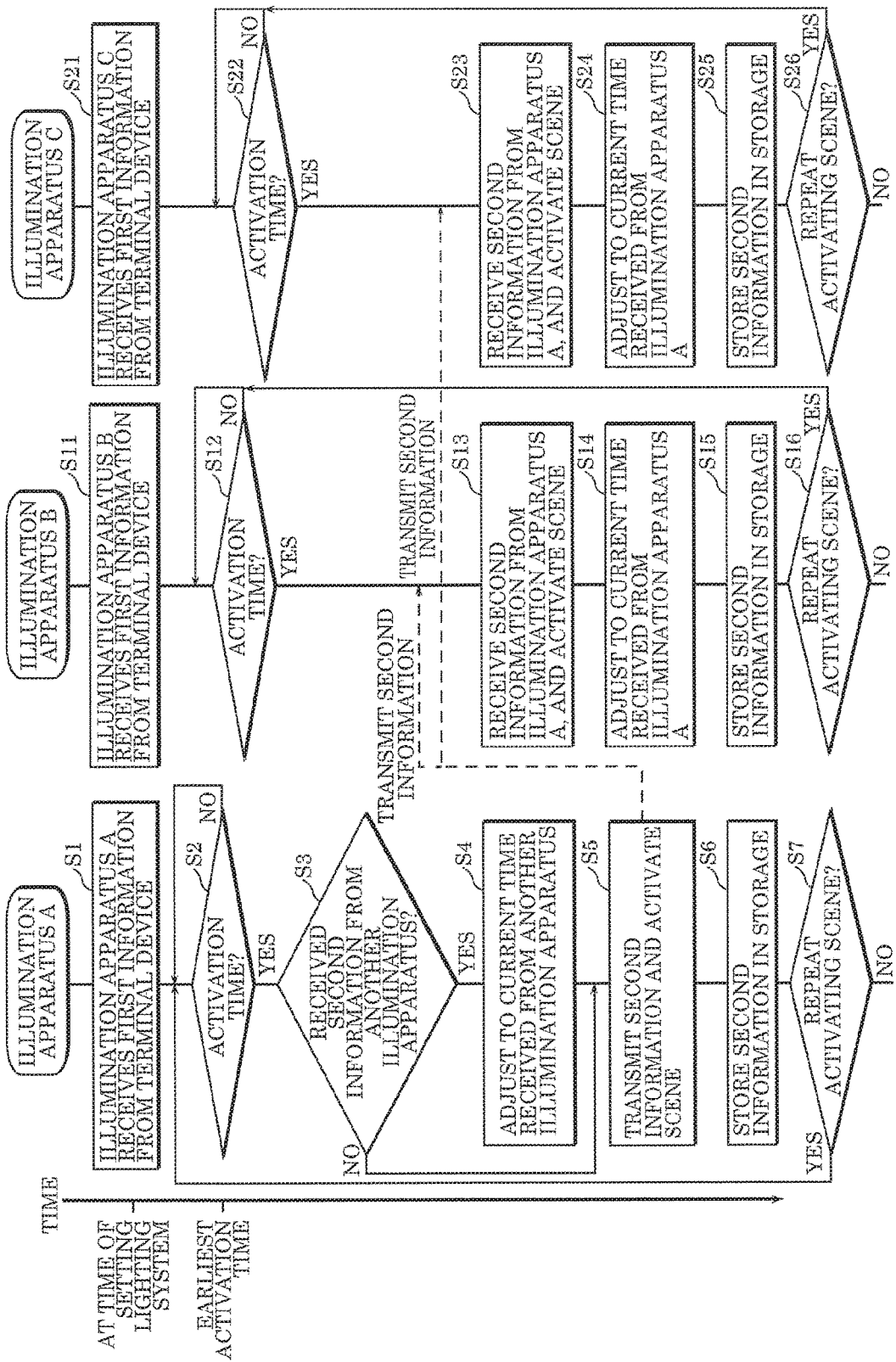

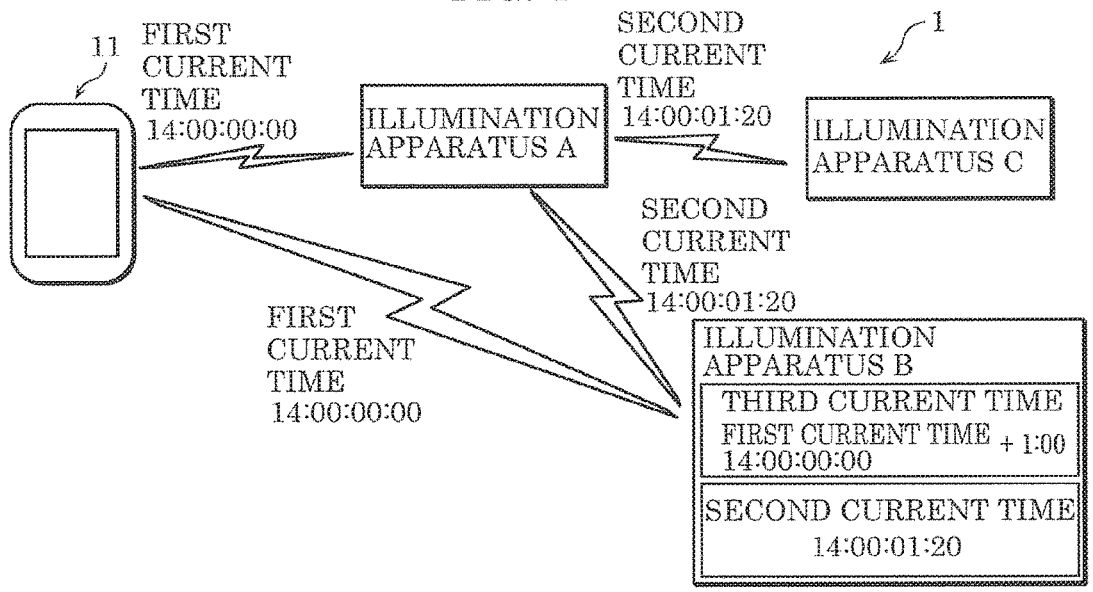

ILLUMINATION APPARATUS AND LIGHTING METHOD

CROSS REFERENCE TO RELATED APPLICATION

This application claims the benefit of priority of Japanese Patent Application Number 2017-026472 filed on Feb. 15, 2017, the entire content of which is hereby incorporated by reference.

BACKGROUND

1. Technical Field

The present disclosure relates to an illumination apparatus and a lighting method, and relates in particular to an illumination apparatus and a lighting method that bring another illumination apparatus in synchronization at a time set by a timer.

2. Description of the Related Art

Conventionally, an illumination apparatus including a light source having changeable illuminance and a controller having a timer that measures time has been disclosed (see Japanese Unexamined Patent Application Publication No. 2014-82218, for example).

SUMMARY

However, with a lighting system including a plurality of conventional illumination apparatuses, in the case of, for example, setting timers included in the illumination apparatuses using a terminal device in an attempt to turn on the illumination apparatuses at the same time, it may not be possible to turn on the illumination apparatuses at the same time because the timers indicate different times. Thus, there is a demand for an illumination apparatus and a lighting method capable of easily synchronizing operations of a plurality of illumination apparatuses.

In view of this, the present disclosure has an object to provide an illumination apparatus and a lighting method capable of synchronizing operations of a plurality of illumination apparatuses.

In order to achieve the above object, an illumination apparatus according to an aspect of the present disclosure includes: a light source; a communication device that performs wireless communication; a timer that indicates a current time; a storage that stores scene information indicating a scene specified by at least one of dimming and toning, and an activation time indicating a time at which the scene indicated by the scene information should be activated; and a controller that, when the current time indicated by the timer reaches the activation time, causes the light source to emit light in a mode for the scene indicated by the scene information, and transmits the scene information and the current time via the communication device.

In order to achieve the above object, an illumination apparatus according to an aspect of the present disclosure is one of a plurality of illumination apparatuses included in a lighting system which divides the plurality of illumination apparatuses into a plurality of groups and operates the plurality of illumination apparatuses on a per-group basis. The illumination apparatus includes: a light source; a communication device that performs wireless communication; a timer that indicates a current time; a storage that stores (i) identification information of a group to which the illumination apparatus belongs, (ii) scene information indicating a scene specified by at least one of dimming and toning, and (iii) an activation time indicating a time at which the scene indicated by the scene information should be activated, the scene information and the activation time being included in setting information of the illumination apparatus; and a controller that causes the light source to emit light in a mode for the scene indicated by the scene information of the group corresponding to the identification information, when the current time indicated by the timer reaches the activation time of the group corresponding to the identification information.

According to the present disclosure, it is possible to synchronize operations of a plurality of illumination apparatuses.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 3 is a sequence diagram illustrating respective operations of illumination apparatus A, illumination apparatus B, and illumination apparatus C in the lighting system according to Embodiment 1;

FIG. 4 is a schematic diagram illustrating a lighting system according to Embodiment 2;

FIG. 5 illustrates identification information of groups to which illumination apparatuses included in a lighting system according to Embodiment 3 belong.

DETAILED DESCRIPTION OF THE EMBODIMENTS

Hereinafter, embodiments of the present disclosure will be described with reference to the drawings. The embodiments described below illustrate specific examples of the present disclosure. Thus, the numerical values, shapes, materials, structural elements, the arrangement and connection of the structural elements, etc., presented in the embodiments below are mere examples and do not limit the present disclosure. As such, among the structural elements in the embodiment below, structural elements not recited in any one of the independent claims defining the most generic concepts of the present disclosure are described as optional structural elements.

Note that each drawing is a schematic illustration and not necessarily a precise illustration. Further, throughout the figures, the same reference signs are given to essentially the same structural elements, and redundant descriptions are omitted or simplified.

Hereinafter, an illumination apparatus and a lighting method according to Embodiment 1 of the present disclosure will be described with reference to FIG. 1.

Embodiment 1

[Configuration]

Figure 1:
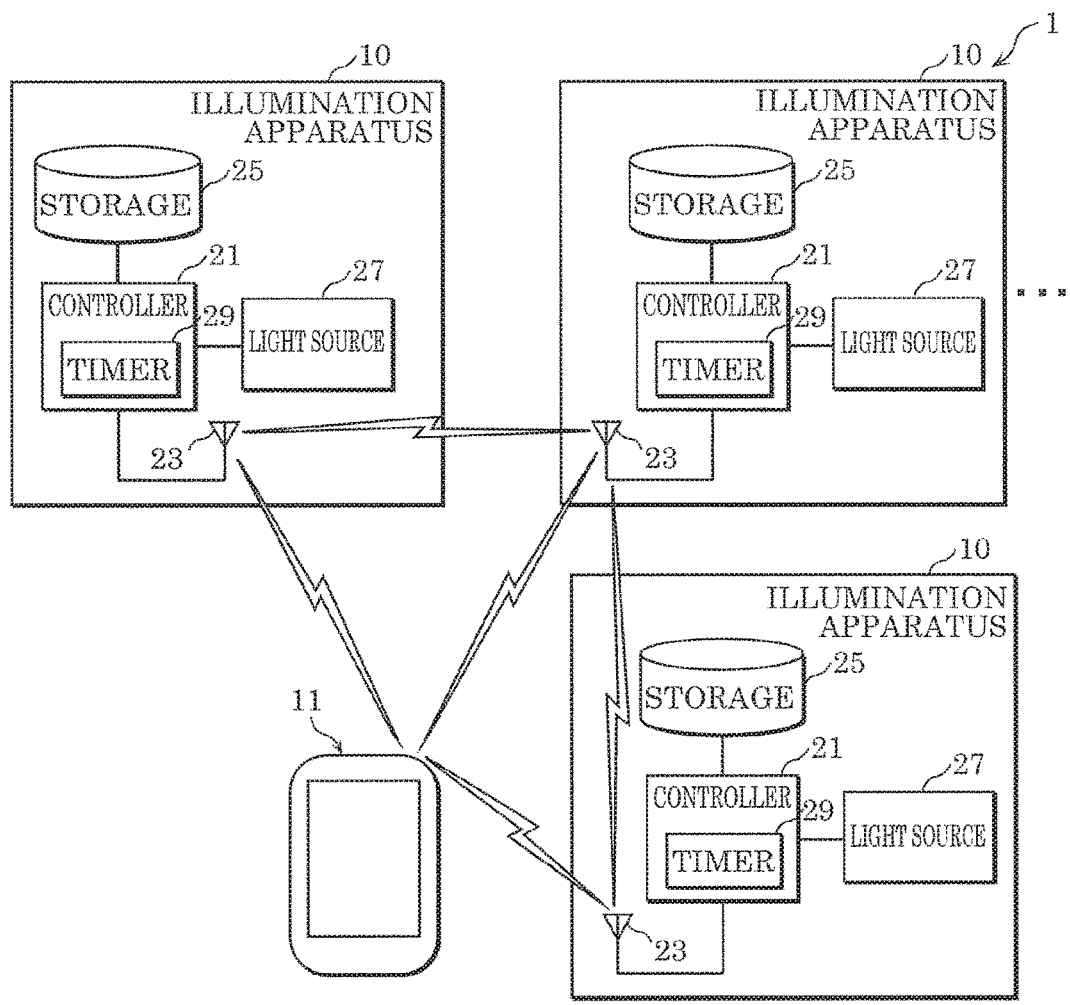
FIG. 1 is a block diagram illustrating a lighting system according to Embodiment 1.

FIG. 1 is a block diagram illustrating lighting system 1 according to Embodiment 1.

As illustrated in FIG. 1, lighting system 1 provides illumination light that can be dimmed and toned. Lighting system 1 includes a plurality of illumination apparatuses 10 and terminal device 11. The plurality of illumination apparatuses 10 and terminal device 11 can wirelessly communicate each other.

Terminal device 11 is an operation terminal that turns on and off illumination apparatuses 10 and performs a dimming function and a toning function on illumination apparatuses 10 in the ON state. Further, terminal device 11 is capable of setting a schedule function to perform dimming and toning at specified times. Although terminal device 11 is a smartphone in the present embodiment, it may be another illumination apparatus, or may be a controller dedicated to illumination apparatuses 10.

Each of illumination apparatuses 10 is turned on, off, etc., according to information wirelessly transmitted from terminal device 11. Illumination apparatus 10 is, for example, an LED apparatus such as a ceiling light, a floor light, a line light, a spotlight, a pendant light, etc. Illumination apparatus 10 has a dimming function to adjust the brightness and a toning function to adjust the color temperature. Illumination apparatuses 10 can communicate with each other. Although, according to the present embodiment, three illumination apparatuses 10 are shown in the figures, the number of illumination apparatuses 10 may be two or less, or may be four or greater. Each illumination apparatus 10 has the same configuration, and thus the description thereof will not be repeated.

Each illumination apparatus 10 includes timer 29, controller 21, communication device 23, storage 25, and light source 27.

Timer 29 indicates a current time. Timer 29 outputs the current time to controller 21 one after another. Note that timer 29 may be configured as a part of controller 21.

Controller 21 receives, via communication device 23, first information transmitted from terminal device 11, and controls light source 27, for example. Here, the first information includes, for example: scene information indicating a scene specified by at least one of dimming and toning of the plurality of illumination apparatuses 10; an activation time indicating a time at which the scene indicated by the scene information should be activated; a current time; and repetition information indicating whether or not activation of the scene is to be repeated after a predetermined time period. These pieces of information included in the first information are set by terminal device 11. Controller 21 stores the received first information in storage 25.

Here, the scene is, for example, the case where light is emitted for studying, the case where light is emitted for watching TV etc., the case where light is emitted as night light, the case where light is emitted for relaxation, the case where light is emitted for gatherings, or the case where light is turned off.

When the current time indicated by timer 29 reaches the activation time, controller 21 causes light source 27 to emit light in a mode for the scene indicated by the scene information, and transmits second information including the scene information and the current time to another illumination apparatus 10 via communication device 23. For example, controller 21 obtains the current time from timer 29, and when the current time reaches an ON time or an OFF time, transmits the second information, such as the scene information and information related to the current time to another illumination apparatus 10. Illumination apparatus 10 activates the scene after transmitting the second information to another illumination apparatus 10. Moreover, another illumination apparatus 10 that has received the second information also activates the scene after receiving the second information.

When the repetition information indicates that activation of the scene is to be repeated, controller 21 repeats causing light source 27 to emit light in a mode for the scene indicated by the scene information after a predetermined time period. For example, every day, when the current time reaches the activation time, controller 21 repeats the operation of turning light source 27 on for the scene indicated by the scene information and turning light source 27 off after a predetermined time period. That is to say, when repetition setting is on, that is, when activation of the scene is to be repeated after a predetermined period, activation of the scene is repeated after the predetermined period.

When the current time indicated by timer 29 reaches the activation time, controller 21 transmits the repetition information in addition to the scene information and the current time to another illumination apparatus 10 via communication device 23. The repetition information is included in the second information.

Another illumination apparatus 10, upon reception of the second information from illumination apparatus 10, performs an operation according to the second information. Specifically, when communication device 23 receives the second information including the scene information, the current time, and the repetition information from another illumination apparatus 10, controller 21 causes light source 27 to emit light in a mode for the scene indicated by the scene information received, and adjusts timer 29 based on the current time received.

Note that another illumination apparatus 10 that has received the second information need not transmit the second information to different illumination apparatus 10. Controller 21 of another illumination apparatus 10 that has received the second information stores the received second information in storage 25.

Controller 21 controls a driver circuit (not illustrated) according to the scene information that sets a scene for the plurality of illumination apparatuses 10. The driver circuit is a lighting circuit that supplies power to light source 27. The driver circuit includes, for example, a diode bridge rectifier circuit that converts AC power into DC power and a DC-DC converter. Note that the driver circuit may be realized by a single integrated circuit (IC) having a function equivalent to the rectifier circuit and the DC-DC converter.

Communication device 23 is a communication device that wirelessly communicates with terminal device 11 and other illumination apparatuses 10, and is connected to controller 21. Communication device 23 receives and transmits the first information and the second information according to controller 21.

Storage 25 stores, for example, the scene information, the activation time, the repetition information, and the current time which are included in the first information and the second information.

Storage 25 is connected to controller 21 and stores the first information and the second information. For example, a semiconductor memory such as a flash memory or an electrically erasable programmable read-only memory (EEPROM) is employed as storage 25. Note that storage 25 may be included in controller 21.

Light source 27 is an element that emits light using the power supplied. In the present embodiment, light source 27 is, for example, a packaged, surface mount device (SMD) white LED element. Note that a chip on board (COB) LED element in which an LED chip is directly mounted on substrate 41 is used.

[Operation of Lighting System]

Next, an operation of lighting system 1 will be described with reference to FIG. 2 and FIG. 3.

Figure 2:
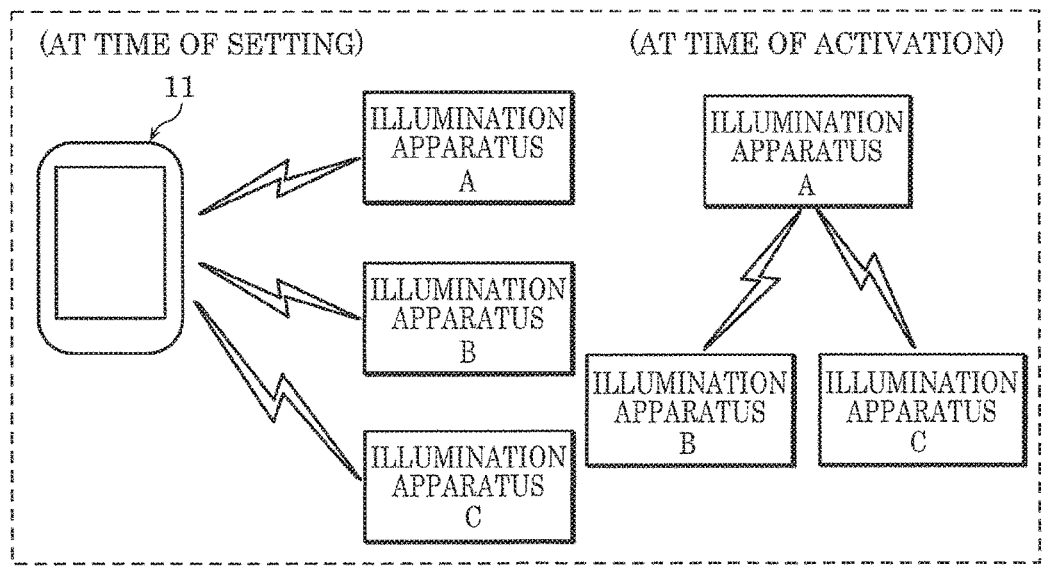
FIG. 2 is a schematic diagram illustrating the lighting system according to Embodiment 1.

FIG. 2 is a schematic diagram illustrating lighting system 1 according to Embodiment 1. FIG. 3 is a sequence diagram illustrating respective operations of illumination apparatus A, illumination apparatus B, and illumination apparatus C included in lighting system 1 according to Embodiment 1. Note that illumination apparatus A, illumination apparatus B, and illumination apparatus C have the same configuration as illumination apparatuses 10, and will thus be described using the configuration illustrated in FIG. 1.

As illustrated in FIG. 1 to FIG. 3, the operation of lighting system 1 will be described based on an example case where illumination apparatus A, illumination apparatus B, and illumination apparatus C are present. Illumination apparatus A, illumination apparatus B, and illumination apparatus C may be the same illumination apparatus or different one. Further, the following description assumes the case where respective timers 29 of illumination apparatus A, illumination apparatus B, and illumination apparatus C indicate different times. It is also assumed that timer 29 of illumination apparatus A is started first, timer 29 of illumination apparatus B is started next, and timer 29 of illumination apparatus C is started last.

First, a user operates terminal device 11 to transmit information such as the scene information, the activation time, the current time, and the repetition information to illumination apparatus A, illumination apparatus B, and illumination apparatus C.

Next, illumination apparatus A receives from terminal device 11 the scene information, the activation time, the current time, the repetition information, etc., that are set by the user (S1). Step S1 is equivalent to the time of setting lighting system 1 on the time axis.

Next, controller 21 of illumination apparatus A determines, based on information related to the activation time, whether or not it is the activation time at which the scene indicated by the scene information should be activated (S2). When determining that it is not the activation time, controller 21 of illumination apparatus A repeats Step S2. When determining that it is the activation time, controller 21 of illumination apparatus A proceeds to the next step. At this time of Step S2 is equivalent to the earliest activation time on the time axis.

Next, controller 21 of illumination apparatus A determines whether or not the second information is received from the other illumination apparatuses (here, illumination apparatus B and illumination apparatus C) (S3).

In this sequence diagram, the activation time of illumination apparatus A is the earliest activation time, and thus, controller 21 of illumination apparatus A determines that the second information is not received (NO in S3), and proceeds to Step S5.

Next, controller 21 of illumination apparatus A transmits the second information to the other illumination apparatuses via communication device 23, and then activates the scene (S5). That is to say, controller 21 of illumination apparatus A causes light source 27 to emit light in a mode for the scene.

Next, controller 21 of illumination apparatus A stores the second information in storage 25 (S6).

Next, controller 21 of illumination apparatus A determines whether or not activation of the scene is to be repeated after a predetermined time period (S7). When controller 21 of illumination apparatus A determines that activation of the scene is to be repeated (YES in S7), the processing returns to Step S2. On the other hand, when controller 21 of illumination apparatus A determines that activation of the scene is not to be repeated (NO in S7), the processing is finished.

Note that when controller 21 of illumination apparatus A has already received the second information from another illumination apparatus, the start of timer 29 included in controller 21 of illumination apparatus A is considered to be late as compared to timer 29 of controller 21 in another illumination apparatus. Therefore, controller 21 of illumination apparatus A adjusts the time indicated by timer 29 of illumination apparatus A to the current time of timer 29 of another illumination apparatus from which controller 21 of illumination apparatus A has received the second information (S4). In this case, unlike Step S5, controller 21 of illumination apparatus A does not transmit the second information to the other illumination apparatuses via communication device 23. Next, Steps S5 to S7 are performed, and then, this processing flow is finished.

In the same manner, illumination apparatus B and illumination apparatus C receive from terminal device 11 the scene information, the activation time, the current time, the repetition information, etc., that are set by the user (S11, S21). Steps S11 and S21 are equivalent to the time of setting lighting system 1 on the time axis. Furthermore, in the same manner, controllers 21 of illumination apparatus B illumination apparatus C determine, based on information related to the activation time, whether or not it is the activation time at which the scene indicated by the scene information should be activated (S12, S22). When determining that it is not the activation time, controllers 21 of illumination apparatus B and illumination apparatus C repeat Steps S12 and S22, respectively. When determining that it is the activation time, controllers 21 of illumination apparatus B and illumination apparatus C proceed to the next step, respectively.

Note that when controller 21 of another illumination apparatus has already received the second information from illumination apparatus A, timer 29 of illumination apparatus A is started earliest. Therefore, controller 21 of illumination apparatus A transmits the second information to illumination apparatus B and illumination apparatus C via communication device 23. After transmitting the second information, illumination apparatus A activates its own scene. In this sequence diagram, timer 29 of illumination apparatus A is started earliest, and thus controllers 21 of illumination apparatus B and illumination apparatus C receive the second information from illumination apparatus A via respective communication devices 23 (S13, S23). Timers 29 of controllers 21 of illumination apparatus B and illumination apparatus C are started later than timer 29 of controller 21 of illumination apparatus A. Thus, by receiving the second information from illumination apparatus A, controllers 21 of illumination apparatus B and illumination apparatus C determine that the second information is received, as in the determination in Step S3. When controllers 21 of illumination apparatus B and illumination apparatus C receive the second information via respective communication devices 23, illumination apparatus B and illumination apparatus C activate the scene (S13, S23). That is to say, controllers 21 of illumination apparatus B and illumination apparatus C causes respective light sources 27 to emit light in a mode for the scene.

Next, controllers 21 of illumination apparatus B and illumination apparatus C adjust respective timers 29 based on the information related to the current time included in the second information received from illumination apparatus A (S14, S24).

Next, controllers 21 of illumination apparatus B and illumination apparatus C store the second information received from illumination apparatus A in storage 25 (S15, S25).

Next, controller 21 of illumination apparatus B determines whether or not activation of the scene is to be repeated after a predetermined time period (S16). Further, controller 21 of illumination apparatus C also determines whether or not activation of the scene is to be repeated after a predetermined time period (S26). When controller 21 of illumination apparatus B determines that activation of the scene is to be repeated (YES in S16), the processing returns to Step S12. On the other hand, when controller 21 of illumination apparatus B determines that activation of the scene is not to be repeated (NO in S16), the processing is finished. When controller 21 of illumination apparatus C determines that activation of the scene is to be repeated (YES in S26), the processing returns to Step S22. On the other hand, when controller 21 of illumination apparatus C determines that activation of the scene is not to be repeated (NO in S26), the processing is finished.

In such a manner, after terminal device 11 makes settings for the plurality of illumination apparatuses 10, controller 21 of an illumination apparatus among the plurality of illumination apparatuses 10 whose timer 29 is started earliest transmits the second information to the other illumination apparatuses via communication device 23. This allows the other illumination apparatuses 10 that received the second information to adjust the current time of respective timers 29. As a result, it is possible to synchronize the operations of the plurality of illumination apparatuses 10.

[Advantageous Effects]

Next, advantageous effects of illumination apparatus 10 and the lighting method according to the present embodiment will be described.

As described above, illumination apparatus 10 according to the present embodiment includes: light source 27; communication device 23 that performs wireless communication; timer 29 that indicates a current time; storage 25 that stores scene information indicating a scene specified by at least one of dimming and toning, and an activation time indicating a time at which the scene indicated by the scene information should be activated; and controller 21 that, when the current time indicated by timer 29 reaches the activation time, causes light source 27 to emit light in a mode for the scene indicated by the scene information, and transmits the scene information and the current time via communication device 23.

As described above, when the current time indicated by timer 29 reaches the activation time, controller 21 causes light source 27 to emit light in a mode for the scene indicated by the scene information, and transmits the scene information and the current time to another illumination apparatus 10 via communication device 23. By receiving the scene information and the current time, another illumination apparatus 10 adjusts the current time and activates the scene indicated by the scene information at the activation time. Accordingly, even when timers 29 of controllers 21 of a plurality of illumination apparatuses 10 are started at different times, it is possible to turn on these illumination apparatuses 10 at the same time by causing another illumination apparatus 10 to activate at a time at which a scene should be activated.

As a result, it is possible to synchronize the operations of the plurality of illumination apparatuses 10.

In particular, since there is no need to individually set the plurality of illumination apparatuses 10 via terminal device 11, the settings of lighting system 1 can be simplified. Furthermore, since the operations of the plurality of illumination apparatuses 10 are brought into synchronization by setting the plurality of illumination apparatuses 10 using terminal device 11 at the initial stage, the operations performed on the plurality of illumination apparatuses 10 can be simplified.

As described above, with illumination apparatus 10 according to the present embodiment, when communication device 23 receives scene information and a current time from an external device, controller 21 causes light source 27 to emit light in a mode for a scene indicated by the scene information received, and adjusts timer 29 based on the current time received.

In such a manner, when scene information and a current time (an example or a part of the second information) are received from an external device, controller 21 causes light source 27 to emit light in a mode for a scene indicated by the scene information received, and adjusts timer 29 based on the current time received. Thus, even when timers 29 of controllers 21 of a plurality of illumination apparatuses 10 are started at different times, these illumination apparatuses 10 can be turned on at the same time.

As described above, in illumination apparatus 10 according to the present embodiment, storage 25 further stores repetition information indicating whether or not activation of the scene is to be repeated after a predetermined time period. Further, controller 21 repeats causing light source 27 to emit light in the mode for the scene indicated by the scene information after the predetermined time period, when the repetition information indicates that activation of the scene is to be repeated. Then, controller 21 transmits the repetition information in addition to the scene information and the current time to another illumination apparatus 10 via communication device 23 when the current time indicated by timer 29 reaches the activation time.

In such a manner, according to the repetition information, controller 21 repeats casing light source 27 to emit light in a mode for the scene indicated by the scene information after the predetermined time period. Thus, when the current time reaches the activation time, controller 21 transmits the repetition information, the scene information, and the current time to another illumination apparatus 10 via communication device 23. Accordingly, once the activation time is set, light source 27 repeatedly emits light in a mode for the scene every time the predetermined time period elapses, and thus, the settings of illumination apparatuses 10 can be simplified.

As described above, a lighting method according to the present embodiment turns on illumination apparatus 10. The lighting method includes: storing scene information indicating a scene specified by at least one of dimming and toning, and an activation time indicating a time at which the scene indicated by the scene information should be activated; and when a current time indicated by timer 29 reaches the activation time, causing light source 27 to emit light in a mode for the scene indicated by the scene information, and transmitting the scene information and the current time.

Embodiment 2

Hereinafter, illumination apparatus 10 according to the present embodiment will be described.

The present embodiment is different from Embodiment 1 in that timer 29 is adjusted based on a time obtained by adding a predetermined elapsed time to the activation time of illumination apparatus 10.

The other structural elements of illumination apparatus 10 are the same as those of illumination apparatus 10 according to Embodiment 1; the same reference signs are given to the same structural elements, and detailed descriptions of such structural elements will not be repeated. For this reason, a block diagram of illumination apparatus 10 according to the present embodiment is omitted, and the description will be given with reference to the block diagram in FIG. 1.

As illustrated in FIG. 1, with lighting system 1, the second information makes hops through the plurality of illumination apparatuses 10 when synchronizing the activation time of illumination apparatus 10 with the activation time of the other illumination apparatuses 10.

When communication device 23 receives the current time from another illumination apparatus 10 that is an example of the external device, controller 21 transmits a time obtained by adding an internally elapsed time (an example of a predetermined elapsed time) to the current time received, to yet another illumination apparatus 10 via communication device 23. This time is used as the current time for synchronization. An internally elapsed time created by the processing in controller 21 is added to the current time. That is to say, in the case where hops take place through the plurality of illumination apparatuses 10, a time obtained by adding the internally elapsed time, which is dependent on the number of times hops take place, to the activation time of illumination apparatus 10 is transmitted to another illumination apparatus 10 via communication device 23 as a new current time. Note that controller 21 may also transmit time to live (TTL) indicating the number of hops, to another illumination apparatus 10 via communication device 23.

Controller 21 of another illumination apparatus 10 receives the time (as current time) obtained by adding the internally elapsed time, which is dependent on the number of hops, to the activation time of illumination apparatus 10. Controller 21 of another illumination apparatus 10 adjusts timer 29 based on the time obtained by adding a predetermined elapsed time to the activation time of illumination apparatus 10. Timer 29 starts counting time from the adjusted time.

When communication device 23 receives a first current time from another illumination apparatus 10 and then a second current time, controller 21 may adjust timer 29 based on a later one of the second current time and a third current time that is obtained by adding a predetermined elapsed time to the first current time. The operation of lighting system 1 in this case will be described using an example. Note that the operation of lighting system 1 in the present embodiment is one example, and is not limited to this example.

FIG. 4 is a schematic diagram illustrating lighting system 1 according to Embodiment 2. FIG. 4 shows illumination apparatus A, illumination apparatus B, and illumination apparatus C as examples of illumination apparatuses.

FIG. 4 illustrates the case where terminal device 11 transmits a first current time (14:00:00:00) to illumination apparatus A and illumination apparatus B. Assume that illumination apparatus C receives each current time from illumination apparatus A. Note that in the present embodiment, the internally elapsed time is 1.20 seconds and the predetermined elapsed time is 1.00 second. Note that terminal device 11 is an example of the external device.

First, when the controller of illumination apparatus A receives the first current time (14:00:00:00) from terminal device 11 via the communication device, illumination apparatus A transmits to illumination apparatus B and illumination apparatus C a second current time (14:00:01:20) obtained by adding the internally elapsed time (1.20 seconds) to the first current time.

Next, illumination apparatus B and illumination apparatus C receive the second current time (14:00:01:20).

Here, the controller of illumination apparatus B has already received the first current time from terminal device 11 via the communication device. After the controller of illumination apparatus B has received the first current time, a period of time (1.00 second, for example) necessary for internal processing is added to the first current time, thereby becomes a third current time (14:00:01:00).

The controller of illumination apparatus B identifies a later one of the third current time and the second current time based on the third current time and the second current time, and adjusts the timer based on the later time. In the present embodiment, the second current time is later than the third current time, and thus the timer is adjusted based on the second current time indicating the later time. After that, the timer starts counting time from the second current time.

Note that in FIG. 4, since there is no other illumination apparatus as a hopping destination apart from illumination apparatus B and illumination apparatus C, the controllers of illumination apparatus B and illumination apparatus C may transmit the second current time to illumination apparatus A via the respective communication devices, and the timer may be adjusted based on the second current time so that the illumination apparatuses will be turned on at the second current time.

[Advantageous Effects]

Next, advantageous effects of illumination apparatus 10 according to the present embodiment will be described.

As described above, in illumination apparatus 10 according to the present embodiment, when communication device 23 receives a current time from an external device, controller 21 transmits, via communication device 23, as a new current time, a time obtained by adding a predetermined elapsed time to the current time received.

In such a manner, controller 21 transmits, as a new current time, a time obtained by adding a predetermined elapsed time to the current time received from an external device, to an other illumination apparatus 10 via communication device 23. Thus, controller 21 of the other illumination apparatus 10 receives the new current time that is one of current times received from a plurality of illumination apparatuses 10 and is later than the current time counted by timer 29. Controller 21 of the other illumination apparatus 10 can use the received time as the new current time. As a result, when bringing the activation times of a plurality of illumination apparatuses 10 into synchronization, delay is less likely to occur in the activation times of the plurality of illumination apparatuses 10 even when hops take place through the plurality of illumination apparatuses 10. Accordingly, illumination apparatus 10 can bring the activation times of the plurality of illumination apparatuses 10 into synchronization.

In such illumination apparatus 10 according to the present embodiment, when communication device 23 receives a first current time from an external device and then a second current time, controller 21 adjusts timer 29 based on a later one of the second current time a third current time that is obtained by adding a predetermined elapsed time to the first current time.

As described above, since controller 21 adjusts timer 29 based on a later one of the second current time and the third current time, controller 21 selects a later one of these current times obtained from a plurality of illumination apparatuses 10. Accordingly, even when hops take place through the plurality of illumination apparatuses 10 for bringing the activation times of a plurality of illumination apparatuses 10 into synchronization, the plurality of illumination apparatuses 10 can operate in synchronization at the synchronized activation time.

The other advantageous effects yielded by the present embodiment are the same as those in Embodiment 1.

Embodiment 3

Hereinafter, illumination apparatus 10 according to the present embodiment will be described.

The present embodiment is different from Embodiment 1 in that identification information identifying a group to which illumination apparatus 10 belongs is added.

The other structural elements of the illumination apparatus are the same as those of the illumination apparatus according to Embodiment 1; the same reference signs are given to the same structural elements, and detailed descriptions of such structural elements will not be repeated.

As illustrated in FIG. 1, illumination apparatus 10 according to the present embodiment is one of a plurality of illumination apparatuses 10 included in lighting system 1 which divides the plurality of illumination apparatuses 10 into a plurality of groups and operates the plurality of illumination apparatuses 10 on a per-group basis. That is to say, the user freely selects illumination apparatuses 10 using, for example, terminal device 11, and the selected illumination apparatuses 10 form one group. For example, a group can be freely formed for each room, each floor. Identification information distinguishing a group from the other groups is assigned to the group via controller 21. Controller 21 associates the group with a scene selected from a plurality of scenes.

Setting information of illumination apparatus 10 includes: scene information indicating a scene specified by at least one of dimming and toning; and an activation time at which the scene indicated by the scene information should be activated. Controller 21 can independently perform: the control on the illumination apparatus based on identification information of the group; and the control on the illumination apparatus based on the setting information of illumination apparatus 10.

For example, when an instruction to change the identification information is received from terminal device 11, controller 21 changes the identification information stored in storage 25 according to the instruction. For example, when a scene is set for each group, and an illumination apparatus in a group is to be changed to another group, the following changes are made, for example: the identification information of the group to which illumination apparatus 10 belongs; the scene information of each of the plurality of groups, indicating a scene specified by at least one of dimming and toning; and the activation time of each of the plurality of groups, indicating a time at which the scene indicated by the scene information should be activated. By doing so, the identification information is changed as well as the group, and thus, the scene information, the activation time, etc., that are associated with the identification information are changed.

When the activation time etc., is changed as a result of the group change, and the current time indicated by timer 29 reaches the activation time of the group corresponding to the identification information, controller 21 causes light source 27 to emit light in a mode for the scene indicated by the scene information of the group corresponding to the identification information.

Storage 25 stores, for example, the identification information and the scene information of the group apart from the scene information, the activation time, the repetition information, and the current time.

[Groups in Lighting System]

Figure 6:
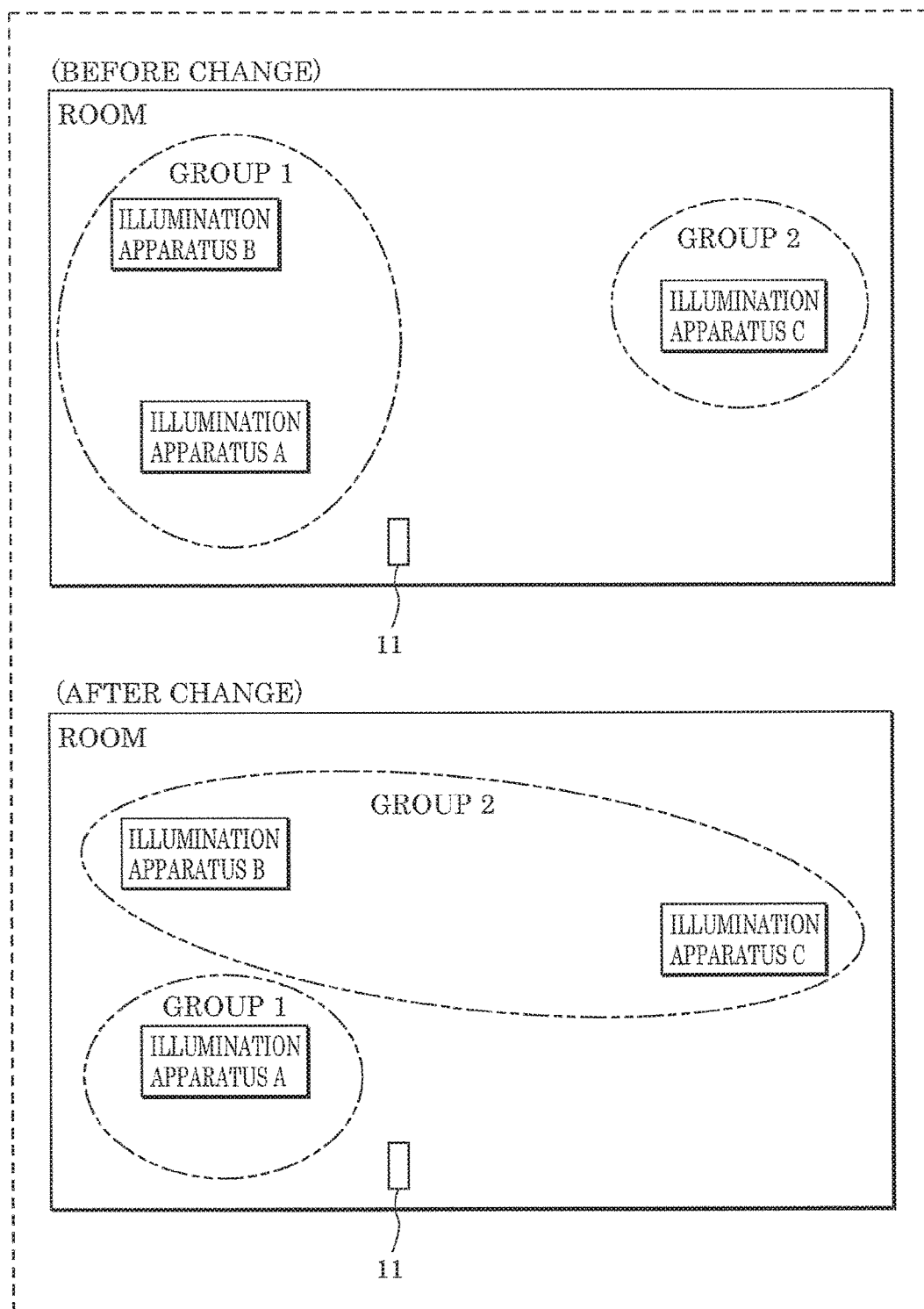
FIG. 6 is a schematic diagram illustrating the groups to which the illumination apparatuses included in the lighting system according to Embodiment 3 belong.

With reference to FIG. 5 and FIG. 6, the case of changing the group of an illumination apparatus included in the lighting system will be described.

FIG. 5 is a schematic diagram illustrating the identification information of groups to which the illumination apparatuses included in the lighting system according to Embodiment 3 belong. FIG. 6 is a schematic diagram illustrating the groups to which the illumination apparatuses included in the lighting system according to Embodiment 3 belong. FIG. 6 illustrates groups using two-dot chain lines.

The initial settings of the lighting system will be described using an example.

As illustrated in FIG. 5 and FIG. 6, the lighting system includes illumination apparatus A, illumination apparatus B, and illumination apparatus C inside a room. In the lighting system, group 1 and group 2 are set, and any one of them can be selected.

With group 1, the illumination apparatuses perform an operation, e.g., the illumination apparatuses are turned on when the time indicated by the timer reaches the activation time 7:00 or the activation time 8:00. With group 2, the illumination apparatus performs an operation, e.g., the illumination apparatus is turned on when the time indicated by the timer reaches the activation time 9:00. That is to say, the activation time is different between group 1 and group 2. In the lighting system with the initial settings, illumination apparatus A and illumination apparatus B belong to group 1, whereas illumination apparatus C belongs to group 2.

In this case, when the group to which illumination apparatus B belongs has been changed from group 1 to group 2 using terminal device 11, illumination apparatus B receives the identification information of the group to which illumination apparatus B belongs from terminal device 11 via the communication device. Note that the setting information of the illumination apparatus is not transmitted at this point because the amount of data is large. The setting information of the illumination apparatus is transmitted after transmitting the identification information of the new group.

The controller of illumination apparatus B stores the identification information, the scene information, the activation time, etc., in the storage. Specifically, the controller of illumination apparatus B overwrites old identification information with new identification information of the group to which illumination apparatus B now belongs, so as to store in the storage the scene information, the activation time, etc., in association with the new identification information. By doing so, when the group is changed, the set values of the illumination apparatus are stored in the storage with minimal rewriting, without changing the scene information and the activation time.

Then, when the current time indicated by the timer reaches the activation time of the group corresponding to the identification information, the controller causes the light source to emit light in a mode for the scene indicated by the scene information of the group corresponding to the identification information.

Note that the number of groups, the activation time, and the number of illumination apparatuses in the lighting system are mere examples, and the lighting system is not limited to such examples.

With the illumination apparatuses described above, the identification information of each group is associated with the activation time. Therefore, when the initial group 1 of illumination apparatus B is changed to group 2, only the group is changed, and illumination apparatus B is not turned on even at 7:00 or 8:00 because the group is different.

Further, a problem that illumination apparatus B is not turned on even at 9:00 because the activation time is 7:00 and 8:00 does not occur.

[Advantageous Effects]

Next, advantageous effects of illumination apparatus 10 according to the present embodiment will be described.

As described above, illumination apparatus 10 according to the present embodiment is one of a plurality of illumination apparatuses 10 included in lighting system 1 which divides the plurality of illumination apparatuses 10 into a plurality of groups and operates the plurality of illumination apparatuses 10 on a per-group basis. Illumination apparatus 10 includes: light source 27; communication device 23 that performs wireless communication; timer 29 that indicates a current time; storage 25 that stores (i) identification information of a group to which illumination apparatus 10 belongs, (ii) scene information indicating a scene specified by at least one of dimming and toning, and (iii) an activation time indicating a time at which the scene indicated by the scene information should be activated, the scene information and the activation time being included in setting information of illumination apparatus 10; and controller 21 that causes light source 27 to emit light in a mode for the scene indicated by the scene information of the group corresponding to the identification information, when the current time indicated by timer 29 reaches the activation time of the group corresponding to the identification information.

In such a manner, since controller 21 associates the identification information of the group to which illumination apparatus 10 belongs with the activation time, light source 27 emits light in a mode for the scene indicated by the scene information when the current time indicated by timer 29 reaches the activation time of the group corresponding to the identification information. This makes it possible to change whether or not to activate the scene, by simply changing the group after making group settings of lighting system 1. Therefore, it is possible to turn on, at the activation time, illumination apparatus 10 whose group has been changed.

As a result, it is possible to synchronize the operations of the plurality of illumination apparatuses 10.

As described above, in illumination apparatus 10 according to the present embodiment, when an instruction to change the identification information is received from terminal device 11, controller 21 changes the identification information stored in storage 25 according to the instruction.

As described, since controller 21 overwrites old identification information stored in storage 25 with new identification information according to the instruction, the scene information and the set time are not changed even when the group is changed. However, since the setting of timer 29 includes information on a group that activates, the illumination apparatuses can normally perform operations even when the group is changed after the actuation of lighting system 1.

The other advantageous effects yielded by the present embodiment are the same as those in Embodiment 1.

As described above, the lighting method according to the present embodiment turns on illumination apparatus 10 that is one of a plurality of illumination apparatuses 10 included in a lighting system which divides the plurality of illumination apparatuses 10 into a plurality of groups and operates the plurality of illumination apparatuses 10 on a per-group basis. The lighting method includes: storing (i) identification information of a group to which illumination apparatus 10 belongs, (ii) scene information indicating a scene specified by at least one of dimming and toning, and (iii) an activation time indicating a time at which the scene indicated by the scene information should be activated, the scene information and the activation time being included in setting information of illumination apparatus 10; and causing light source 27 to emit light in a mode for the scene indicated by the scene information of the group corresponding to the identification information, when a current time indicated by timer 29 reaches the activation time of the group corresponding to the identification information.

Other Embodiments

Although Embodiments 1 to 3 have been described above, the present disclosure is not limited to Embodiments 1 to 3.

For example, in the above embodiments, the communication device may perform communication using ZigBee (registered trademark), and may communicate with the terminal device using Bluetooth (registered trademark), a wireless local area network (LAN), etc.

Furthermore, in the above embodiments, the setting of the scene specified by at least one of dimming and toning, the setting of groups on a per-set scene basis (Embodiment 3), the setting of the activation time, etc., may be freely selected.

Hereinbefore, one or more aspects of the present disclosure have been described based on Embodiments 1 to 3; however, the present disclosure is not limited to Embodiments 1 to 3. Various modifications to these embodiments conceivable to those skilled in the art, as well as embodiments resulting from combinations of structural elements of different embodiments may be included within the scope of one or more aspects of the present disclosure, as long as such modifications and embodiments do not depart from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination apparatus, comprising:
   a light source;
   a communication device that performs wireless communication;
   a timer that indicates a current time;
   a storage that stores scene information indicating a scene specified by at least one of dimming and toning, and an activation time indicating a time at which the scene indicated by the scene information should be activated; and
   a controller that, when the current time indicated by the timer reaches the activation time, causes the light source to emit light in a mode for the scene indicated by the scene information, and transmits the scene information and the current time indicated by the timer to an external device via the communication device, wherein
   the controller adjusts the current time indicated by the timer to synchronize with a current time of the external device according to an internally elapsed time in the illumination apparatus, when the communication device receives the current time of the external device from the external device, the internally elapsed time being a time duration after receiving the current time of the external device.

2. The illumination apparatus according to claim 1, wherein
when the communication device receives scene information and the current time of the external device from the external device, the controller causes the light source to emit light in the mode for the scene indicated by the scene information received, and adjusts the timer based on the current time of the external device received from the external device.

3. The illumination apparatus according to claim 1, wherein
the storage further stores repetition information indicating whether or not activation of the scene is to be repeated after a predetermined time period, and
the controller:
repeats causing the light source to emit light in the mode for the scene indicated by the scene information after the predetermined time period, when the repetition information indicates that activation of the scene is to be repeated; and
transmits the repetition information in addition to the scene information and the current time indicated by the timer to an external device via the communication device when the current time indicated by the timer reaches the activation time.

4. The illumination apparatus according to claim 1, wherein
when the communication device receives the current time of the external device from the external device, the controller transmits, via the communication device, as a new current time, a time obtained by adding the internally elapsed time to the current time received.

5. The illumination apparatus according to claim 1, wherein
when the communication device receives a first current time and then a second current time of the external device from the external device, the controller adjusts the timer based on a later one of the second current time and a third current time that is obtained by adding the internally elapsed time to the first current time.

6. The illumination apparatus according to claim 1, wherein
the external device is another illumination apparatus different from the illumination apparatus.

7. The illumination apparatus according to claim 6, wherein
the illumination apparatus transmits the scene information and the current time indicated by the timer to a still another illumination apparatus by making a hop through the other illumination apparatus.

8. An illumination apparatus that is one of a plurality of illumination apparatuses included in a lighting system which divides the plurality of illumination apparatuses into a plurality of groups and operates the plurality of illumination apparatuses on a per-group basis, the illumination apparatus comprising:
a light source;
a communication device that performs wireless communication;
a timer that indicates a current time;
a storage that stores (i) identification information of a group to which the illumination apparatus belongs, (ii) scene information indicating a scene specified by at least one of dimming and toning, and (iii) an activation time indicating a time at which the scene indicated by the scene information should be activated, the scene information and the activation time being included in setting information of the illumination apparatus; and
a controller that causes the light source to emit light in a mode for the scene indicated by the scene information of the group corresponding to the identification information and transmits the scene information and the current time indicated by the timer to an external device via the communication device, when the current time indicated by the timer reaches the activation time of the group corresponding to the identification information, the external device including at least one of the plurality of illumination apparatuses, wherein
the controller adjusts the current time indicated by the timer to synchronize with a current time of the external device according to an internally elapsed time in the illumination apparatus, when the communication device receives the current time of the external device from the external device, the internally elapsed time being a time duration after receiving the current time of the external device.

9. The illumination apparatus according to claim 8, wherein
when an instruction to change the identification information is received from a terminal device, the controller changes the identification information stored in the storage according to the instruction.

10. The illumination apparatus according to claim 8, wherein
the controller changes the group to which the illumination apparatus belongs to a different group in the plurality of groups, and updates the identification information stored in the storage to indicate the different group.

11. A lighting method for turning an illumination apparatus on, the method comprising:
storing scene information indicating a scene specified by at least one of dimming and toning, and an activation time indicating a time at which the scene indicated by the scene information should be activated;
when a current time indicated by a timer reaches the activation time, causing a light source to emit light in a mode for the scene indicated by the scene information, and transmitting the scene information and the current time indicated by the timer to an external device; and
when a current time of the external device is received from the external device, adjusting the current time indicated by the timer to synchronize with the current time of the external device according to an internally elapsed time in the illumination apparatus, the internally elapsed time being a time duration after receiving the current time of the external device.

12. A lighting method for turning on an illumination apparatus that is one of a plurality of illumination apparatuses included in a lighting system which divides the plurality of illumination apparatuses into a plurality of groups and operates the plurality of illumination apparatuses on a per-group basis, the method comprising:
storing (i) identification information of a group to which the illumination apparatus belongs, (ii) scene information indicating a scene specified by at least one of dimming and toning, and (iii) an activation time indicating a time at which the scene indicated by the scene information should be activated, the scene information and the activation time being included in setting information of the illumination apparatus;
causing a light source to emit light in a mode for the scene indicated by the scene information of the group corresponding to the identification information, when a current time indicated by a timer reaches the activation time of the group corresponding to the identification information; and when a current time of an external device is received from the external device, adjusting the current time indicated by the timer to synchronize with the current time of the external device according to an internally elapsed time in the illumination apparatus, the internally elapsed time being a time duration after receiving the current time of the external device.

* * * * *